United States Patent [19]

Houser et al.

[11] 4,134,749
[45] Jan. 16, 1979

[54] ORGANIC WASTE MATERIAL DIGESTION APPARATUS AND SYSTEM

[75] Inventors: John E. Houser, Marion; Ralph J. Kramer, Delaware, both of Ohio

[73] Assignee: Aerotherm, Inc., Delaware, Ohio

[21] Appl. No.: 797,627

[22] Filed: May 17, 1977

[51] Int. Cl.² .................................................. C05F 11/08
[52] U.S. Cl. .................................... 71/9; 195/127; 71/21; 71/22; 426/807
[58] Field of Search ............... 71/9, 21, 22; 23/259.1, 23/290.5; 259/102, 40

[56] References Cited

U.S. PATENT DOCUMENTS

| | | | |
|---|---|---|---|
| 3,114,622 | 12/1963 | Hardy | 71/9 |
| 3,357,812 | 12/1967 | Snell | 71/9 |
| 3,584,842 | 6/1971 | Sukup | 259/102 |
| 3,592,447 | 7/1971 | Steffen | 259/102 |
| 3,776,512 | 12/1973 | McKinnon | 259/102 |
| 4,046,551 | 9/1977 | Anderson | 71/10 |

FOREIGN PATENT DOCUMENTS

| | | | |
|---|---|---|---|
| 2505897 | 8/1975 | Fed. Rep. of Germany | 71/9 |
| 1590659 | 5/1970 | France | 71/22 |

*Primary Examiner*—S. Leon Bashore
*Assistant Examiner*—Chris Konkol
*Attorney, Agent, or Firm*—Sidney W. Millard

[57] ABSTRACT

System and apparatus for treating organic waste material, suited, for example, for the aerobic-thermophilic treatment of cattle manure. The waste material initially is commingled with an expanded, size limited dry cellulosic material in a mixing stage, preferably, a pug mill device, to achieve a bulk density and moisture content optimized for thermophilic digestion. A digestion arrangement is provided assuming a reliability for complete aerobic treatment of all material removed therefrom.

14 Claims, 11 Drawing Figures

ORGANIC WASTE MATERIAL DIGESTION APPARATUS AND SYSTEM

BACKGROUND

The treatment of waste, whether generated through municipal collection systems or through a broad range of industries, may be observed to vary from simple land fill techniques to somewhat sophisticated chemical and biochemical conversion methods. With the latter methods, significant capital commitments generally are called for which require justification by virtue of environmental protection requirements and/or the generation of profitable by-products.

Controlled composting procedures are considered to offer significant promise for providing for an improved disposal of biodegradable industrial and municipal wastes while generating a somewhat valuable compost designated by-product. To develop a value for that compost by-product, however, it is necessary that economical procedures be provided to achieve a uniform, optimum level of digestion or biodegradation thereof as well as to assure its immunity from deleterious pathogens and the like.

The more primitive of the compositing procedures utilize, for instance, simple windrowing manipulation of waste material, while more sophisticated digestive systems heretofore proposed look to multi-phase procedures of controlled decomposition. For instance, in one arrangement, as disclosed in U.S. Pat. No. 2,820,703, the waste materials are caused to undergo a fungal mold action, following which a period wherein decomposition is predominantly carried out by bacteria active in a mesophilic phase at temperatures below 45°–50° C is effected. Generally following such a phase, a period of maximum biodegradation is permitted to ensue wherein bacteria in the thermophilic phase at temperatures of about 45°–50° C are witnessed. These multi-phase techniques for waste decomposition have been observed to exhibit numerous disadvantages when considered for use in most installations. For instance, more elaborate plant facilities are required, pathogens and the like are present in the noted preliminary digestive phases to engender objectionable odors as well as lead to health control complications, sterilzation of the by-product not being fully assured.

Proposals for overcoming these disadvantages through the utilization of systems operating only in the thermophilic phase and temperature ranges associated therewith have been propagated, see for instance U.S. Pat. No. 3,010,801; 3,138,448, and 3,285,732 by Schulze. Additional approaches to the manyfold problems associated with digestive-type installations are those described in Pierson, U.S. Pat. No. 3,523,012 and Hardy, U.S. Pat. No. 3,114,622. Generally, the difficulties encountered in the development of the systems heretofore proposed appeared to have involved a failure of meeting the biochemical oxygen demand of the digestive process, failure to maintain necessary temperatures to achieve thermophilic phase decomposition as well as failure to derive a practical arrangement for assuring that all particles of the biodegradable waste material are fully treated in a practical manner within the process.

Another aspect of the subject matter resides in the need for developing an aerobic digestive facility capable of generating a reliable compost material by-product for use by smaller industrial and municipal entities. For example, an immediate need for such a facility is present in the cattle raising industry for converting manure and related waste to valuable by-products. Where properly processed, this by-product will retain nutrients permitting its use as a feed supplement for cattle. Thus utilized, the by-product permits a significant lowering of the cost of producing beef. Of course, the facility for digesting such by-products must be operable under conditions of high reliability and must be available at a capital investment commensurate with the development of a profit through by-product utilization.

SUMMARY

The present invention is addressed to an improved process, system and method for compositing waste material by aerobic bacterial decomposition. Characterized in exhibiting a capability for economically converting solid wastes and the like to a compost by-product of high reliability and quality, the system and apparatus of the invention retain a capability for economic utilization within relatively smaller scale farm and industrial installations. For example, when incorporated with a cattle raising facility, manure and related waste products advantageously are pretreated at practical cost and in a manner enhancing the reliability of later digestion procedures. A premixing of the manure with a size-limited, expanded biodegradable cellulosic material is carried out. This mixing procedure establishes a bulk density for the resultant biodegradable material which s optimized for deriving reliabile composting material. In farm or cattle related applications, this cellulosic material may be selected as straw which is treated from a bale-type package configuration to provide the expanded quality and size-limited characteristic desired. By utilizing a relatively dry straw material, a desired moisture content for the finally mixed material may be achieved. Additionally, should further moisture input or adjuvants be required for the material forwarded to a digestion step, such moisture is uniformly admixed at this mixing stage of the process.

For the noted mixing stage the process uniquely utilizes a pug mill, present as an elongate screw paddle type mixer, the shredded straw and manure, for instance, being deposited at one end of the mixer and gradually mixed by the device to exit therefrom for delivery to a digester facility. For fully integrated farm operations, slaughter house or packing house wastes may be admixed with the straw and manure at the input to this mixing stage. In addition to adjusting for optimized moisture content, the mixer adjusts the bulk density or consistency of the material to facilitate the passage of oxygen laden gas therethrough during later occuring digestive phases of the system.

The digestive apparatus of the system is characterized by an advantageous arrangement providing an assurance that all solid waste material particles submitted thereto are subjected to a thermophilic phase biodegradation at corrsponding sterilizing temperature ranges. Utilizing a receptacle of generally cylindrical surface configuration, the digestion apparatus incorporates oxygen laden gas supplying conduit of predetermined pattern positioned within the bottom thereof beneath a diffusion material such as coarse aggregate. The latter provides for further diffusing of air issuing from the pattern of conduits. A rigid cover is rotatably positioned over the top of the receptacle and serves to complete a full enclosure of the apparatus. Waste material is deposited along the surface of the receptacle through an opening in the rigid roof. Auger-type agitators extending from the roof into the waste material are rotated from their roof mounted position to effect a gradual movement of the material toward the center of the apparatus. At the bottom level of that center portion of the apparatus, a relatively small opening or orifice in the diffuser material is provided for removing fully digested wastes. As the biodegradable material migrates under the influence of the agitators, it undergoes a progressive thermophilic reaction in consequence of air passing from the conduits and through the diffusion material. The oxygen content of this supplied air as well as the temperature of the reacting waste material is monitored in a series of regions in the path of migration of the particles to achieve a most efficient performance for the digestion apparatus. Inasmuch as material can only be removed from the bottom portion of the apparatus at an exit point of relatively small dimension, only fully reacted materials are capable of reaching such exit point. In a preferred arrangement of the apparatus, one of the auger-type agitator members is positioned above at least a portion of the exit orifice to provide a sufficient agitation of the fully digested materials located thereover to facilitate its removal therethrough.

Following digestion of manure-type materials, the resultant composted material is removed to a storage facility, whereupon it may be utilized as an agricultural compost or somewhat inert carrier for fertilizer and the like. However, preferably the material is admixed with additional feed material for recycling as a cattle feed. This material may constitute, for instance, thirty percent of the nutrient value of the feed with which it is admixed.

In a preferred arrangement of the digestion apparatus of the invention, the auger-type agitators are supported from the rigid cover of the digester apparatus and spaced therealong in mutual adjacency along alternate radii extending from the center of the rigid roof. With such an arrangement, migration of material deposited along the outer surface of the retainer is manipulated toward the center of the device in a more reliable manner. As another aspect and object of the invention, these auger-type agitators are driven at progressively diminishing angular velocities as they are positioned from the outer extent of the cylindrical digester toward the center portion thereof. As above, such an arrangement improves the migrational aspects of the material deposited within the apparatus. Drive for the auger-type agitators can be provided upon the noted rigid cover, which, in turn, is driven about the periphery of the receptacle by motor arrangements mounted upon the rigid roof. These motor drive arrangements, preferably, are positioned at diametrically opposite positions upon the rigid roof to assure that rotational drive is symmetrically imposed upon the rigid roof.

Other objects of the invention will, in part, be obvious and will, in part, appear hereinafter. The invention, accordingly, comprises the system, process and apparatus possessing the construction, steps and procedures, combination of elements and arrangement of parts which are exemplified in the following detailed disclosure.

For a fuller understanding of the nature and objects of the invention, reference should be had to the following detailed description taken in connection with the accompanying drawings

DETAILED DESCRIPTION

The system of the present invention particularly is suited for the treatment of animal wastes generated in the cattle raising and related processing industries. It readily may be designed for profitable installation and operation within cattle raising farm facilities having capacities ranging, for example, from a few hundred head to relatively large production or processing enterprises. Its profitability stems from the provision of a capability for generating a valuable by-product. This by-product may be a compost material saleable in both the farm and horticultural industries or through retail outlets. Additionally, through appropriate control over the extent of digestion, the by-product may be utilized as a supplement constituting, for example, 30% of the feed requirements for the cattle. Thus utilized, the by-product represents a significant saving in cattle production costs. To facilitate the discussion to follow, such a manure treating system is delineated both in block flow logic diagrammatic fashion as well as in a description of the facility incorporating the system.

Figure 1:
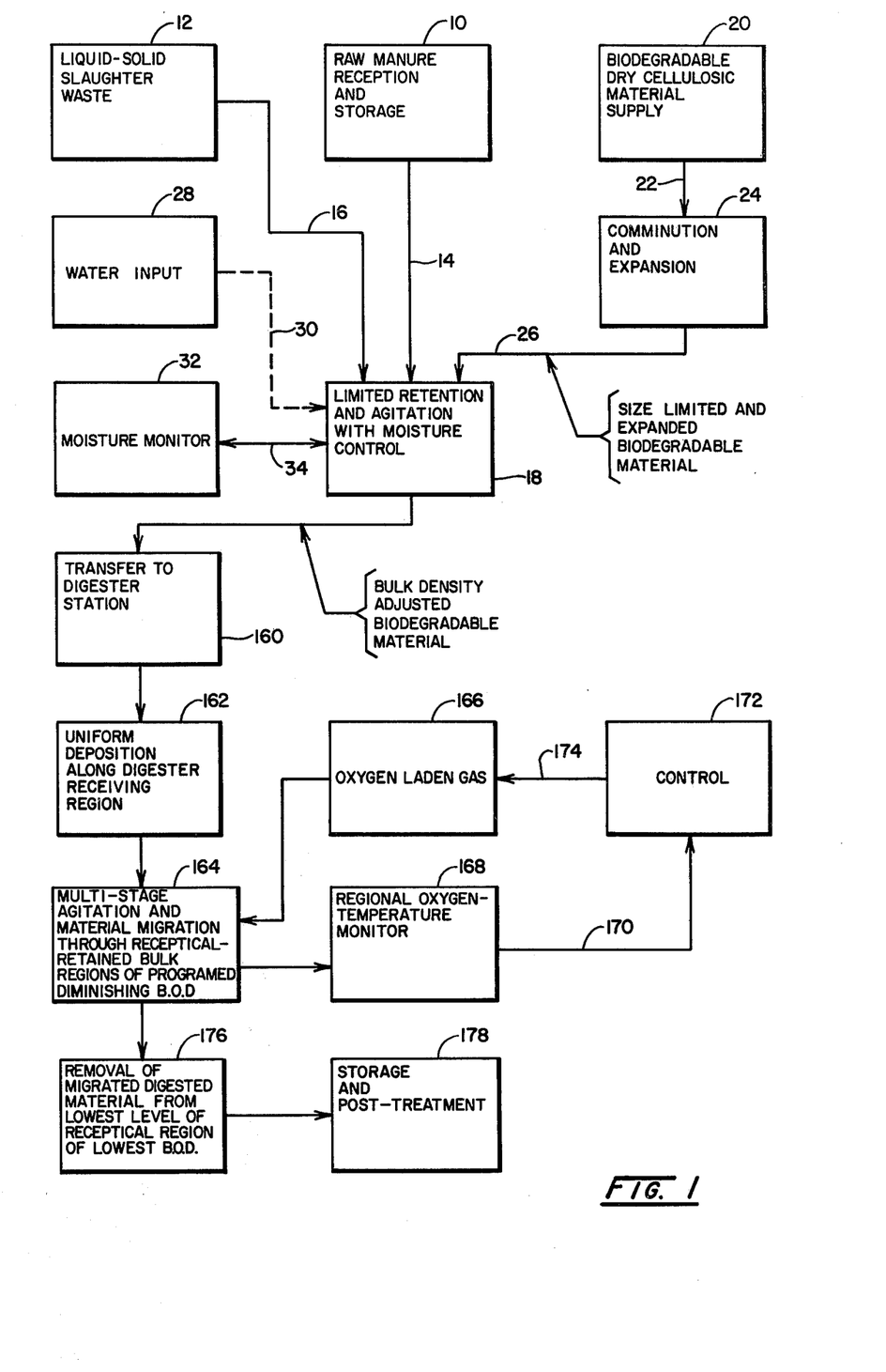
FIG. 1 is a block flow-type diagrams showing the system and method of the invention.

Looking to FIG. 1 the noted block logic arrangement of the system is revealed to include a block 10 representing a station wherein raw manure is collected or received and stored pending its introduction into the treatment system. Additionally revealed is a liquid-solid slaughter waste input 12. Input 12 would be deprived in facilities having a vertically integrated form of processing wherein cattle not only are raised but are slaughtered for meat production. The waste products of such production will have a nutrient value contribution to the feed supplementing compost material ultimately generated from the system. Stations 10 and 12 are shown having feed line inputs respectively at 14 and 16 leading to a limited retention and agitation station 18 incorporating a moisture control aspect. FIG. 1 also reveals the presence of a supply of biodegradable cellulosic material, as represented by block 20. This material, which for the manure treatment facility contemplated may be readily available straw, is shown having a line 22 feeding to a comminution and expansion stage represented by block 24. At stage 24 the straw is shredded and, in consequence, expanded to generate a size limited and expanded biodegradable material, as appropriately labeled within feed line 25, which extends from stage or block 24 to limited retention and agitation function block 18.

FIG. 1 also reveals a water input feature at block 28 having a dashed feed line 30 extedning to limited retention and agitation function 18. Moisture input from function 18 only is required in cases where the materials leading to function 18 are of such dry consistency as to be below that moisture content considered optimum for digestion procedures. In the same regard, a moisture monitor function is represented at block 32 which, operating through function line 34 determines the moisture content of the materials being mixed at block 18 to assure appropriate moisture content. For smaller facilities the functions represented at blocks 28 and 32 are intermittently utilized and may be provided using manual as opposed to automated procedures.

Figure 3:
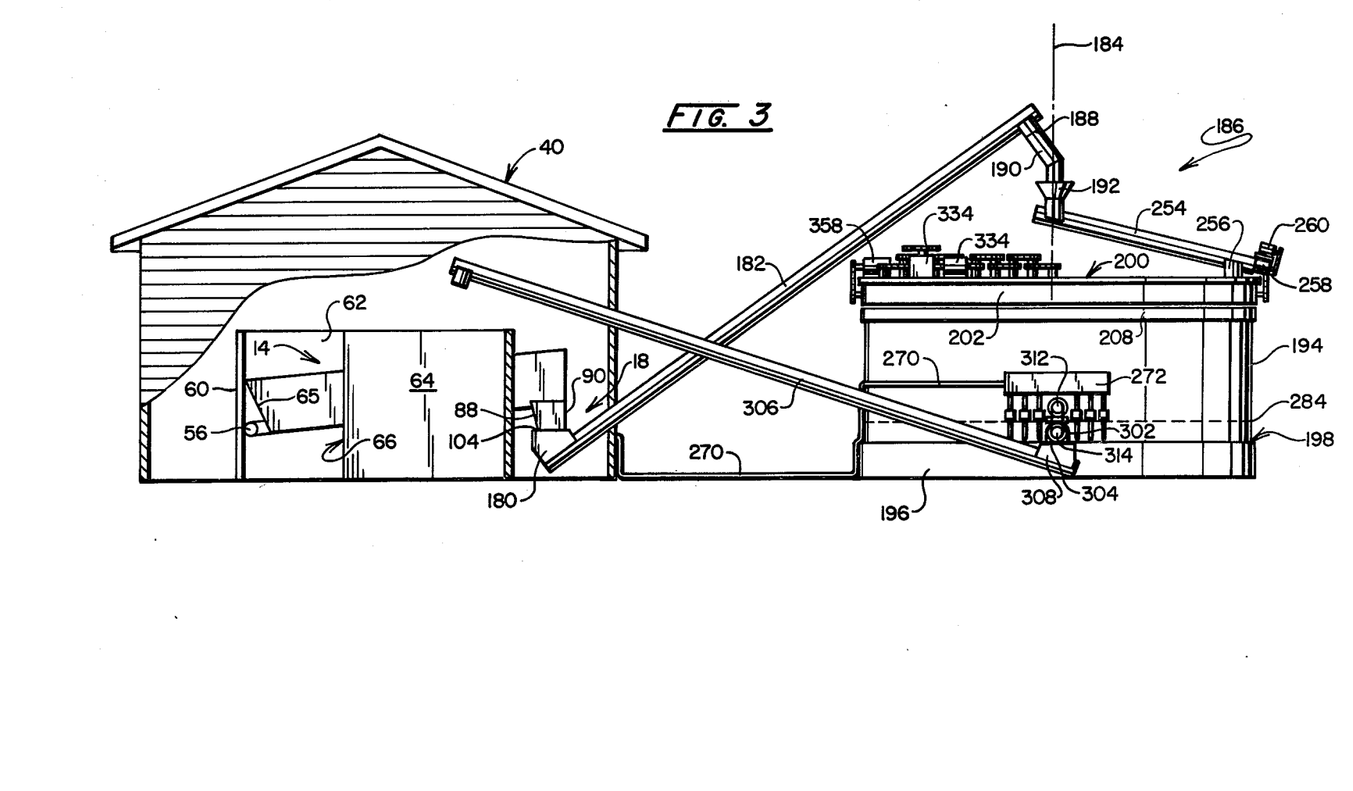
FIG. 3 is a side elevational view of the facility of FIG. 2.
Figure 4:
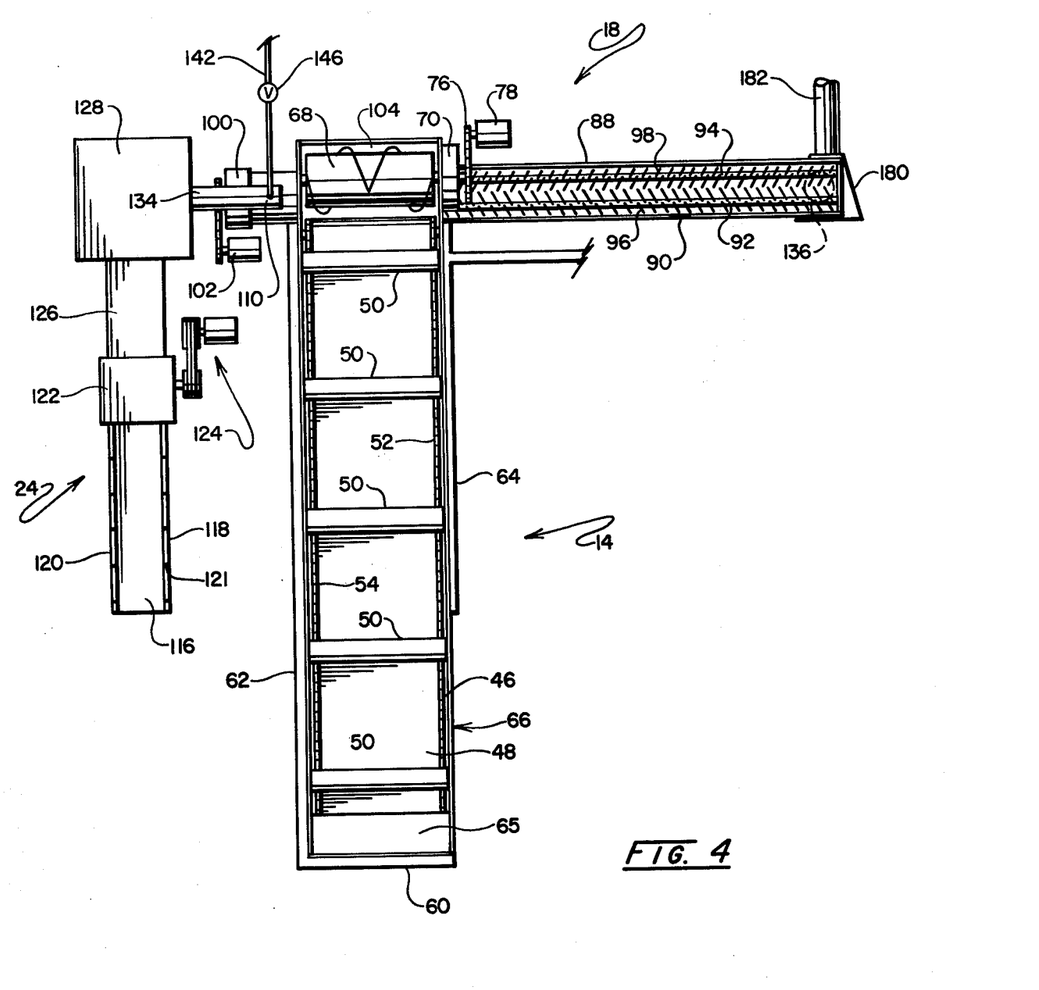
FIG. 4 is a partial plan view of components of the apparatus shown in FIG. 2.
Figure 5:
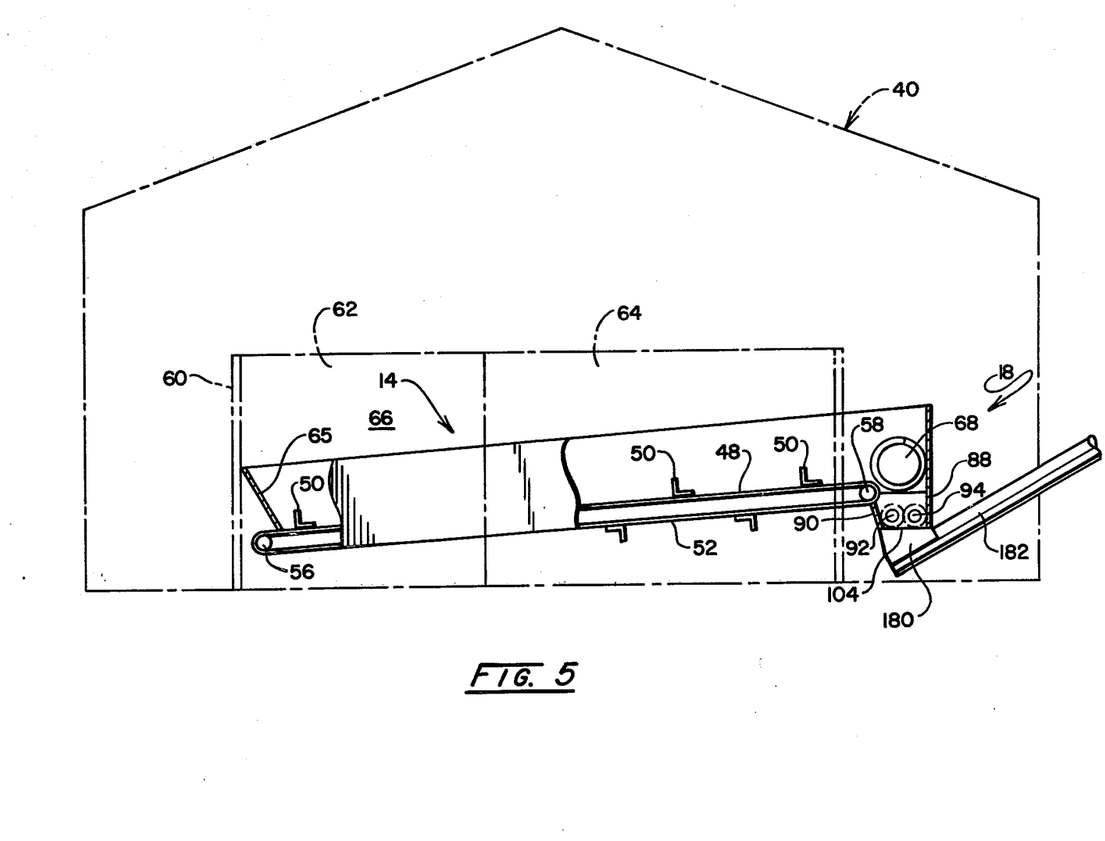
FIG. 5 is a partial side elevational view of the facility of FIG. 2.

Referring additionally to FIGS. 2 through 5, a facility incorporating the above delineated functions or stations is revealed. The facility includes a conventional farm type or industrial building 40 within which several of the functions are incorporated and which serves to protect them from atmospheric elements and the like. Where appropriate, the functions abovedescribed again are represented in general fashion by the same numeration. For example, raw manure storage is provided at 10 and is accesssed through a door opening 42, while straw or cellulosic material supply 20 is accessed through a door or opening 44. Manure from storage area 10 is loaded by front end loaders or the like upon a manure feeder represented generally at 14. Looking particularly to FIG. 4, feeder 14 may be fabricated utilizing the components of conventional farm manure handling equipment, for instance as produced by John Deere Company. In this regard, feeder 14 may be a flight type having a bed portion 48 over which are drawn angle flights 50. The opposite ends of flights 50 are coupled to chain drives 52 and 54 which extend about drive sprockets two of which are revealed at 56 and 58 coupled with chain 52 (FIG. 5). The flight feeder is enclosed by vertical walls 64-64, the latter being foreshortened to provide an access opening for front-end loader feeding as at 66. Within this opening, a canted rear wall 65 assures forward movement of all deposited material.

The feed or forward end of feeder 14 incorporates a conventional beater 68, having spirally oriented teeth, which is coupled for rotation in a sense opposite the rotational drive, for instance, or sprocket 58. This rotation is in an opposite sense as conventionally utilized with manure spreader beaters. Drive for beater 68 is supplied through a reduction gearing assembly 70, belt drive 76 and motor 78. This motor 78 also may be utilized to supply power to the drive sprockets of the flight feeder as at 58. By providing a counter-rotation of beater 68, manure urged thereagainst by the flights 50 of the feeder is driven downwardly through a small gap intermediate the base or bed portion 48 of the feeder and the teeth of beaters 68 to be selectively deposited within a screw-type paddle mixer represented generally at 18. Different forms of beater are available for accommodating to variations in manure moisture content. Typically for a six hundred head capacity facility, the flight feeder will move at a rate of about 10 feet per hour and serve to feed manure at a rate of about 4 tons per hour.

The paddle mixer represented at 18 having its top removed for clarity, is of conventional design and comprises a generally box-shaped housing the elongate sides of which are shown at 88 and 90. Extending along the length of this housing are two centrally disposed rotatable shafts 92 and 94 each of which carries a plurality of serially disposed paddles certain of which are represented respectively at 96 and 98. Shafts 92 and 94 are driven in a counter-rotative sense through a reduction gear arrangement shown generally at 100 which, in turn, is coupled by a belt to a motor 102. Paddle mixers are available in the market, for instance, from Link-Belt Co. Chicago Illinois. Access to the rotating paddles of the mixer is provided through a hopper portion thereof 104 disposed directly beneath beater 68.

A second hopper 110 is positioned rearwardly of hopper portion 104 for receiving the cellulosic materials and other optional inputs for mixing with manure within the mixing station 18. The principal input through this hopper is a biodegredable cellulosic material which, for the instant application, may be conventional dry straw.

Figure 2:
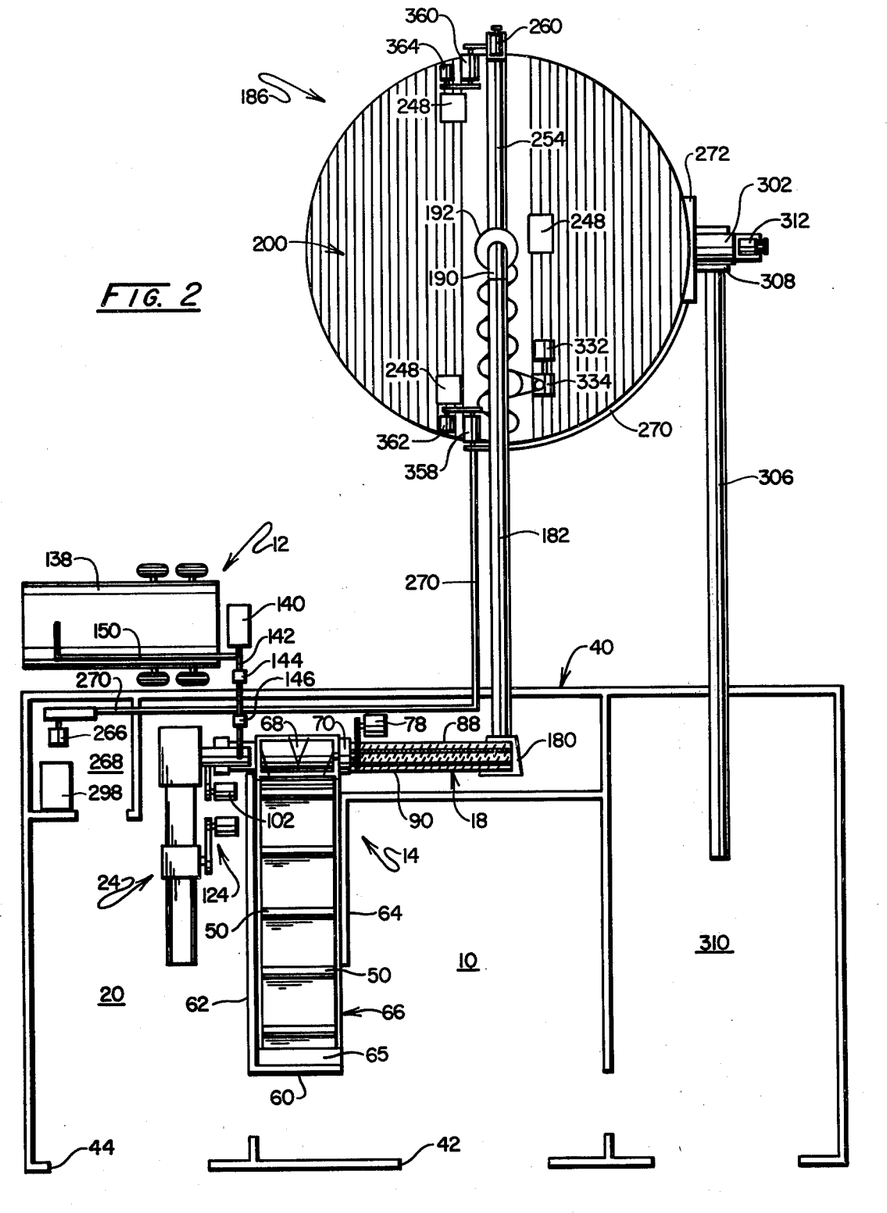
FIG. 2 is a plan view of a digester facility incorporating the system and apparatus of the invention and suited for a farm-type manure treating application.

Straw is conveniently stored in the region of the building designated generally at 20 (FIG. 1) in preparation for its comminution and expansion at station 24. Looking to that station, a platform 116 is provided for receiving bales of straw. This platform carries a chain conveyor incorporating chain components 118 and 120 having dog-type protrusions 121 which serve to grip the bales and maneuver them into a hammermill 122. Mill 122 as well as chain components 118 and 120 are driven from a motor and belt assembly shown generally at 124. Upon being shredded and expanded, the size-limited and expanded biodegradable straw is blown through a conduit 126 to be deposited into a holding bin 128. Generally, the capacity of the shredder and bin for the noted six hundred head installation will be about ¼ ton of straw per day. Hammermill devices suitable for utilization at station 24 are available in the market through John Deere Company, Chicago Illinois.

During the operation of the paddle mixer at 18, the shredded straw or equivalent biodegradable cellulosic material is withdrawn from holding bin 128 by a variable speed conveyor 134 which deposits the material at a predetermined rate within a hopper shown generally at 110. This material then is mixed with manure entering hopper portion 104 of the mixer whereupon the two materials are progessively mixed by the paddles and gradually maneuvered toward an output port 136 of station 18. By virtue of the mixing activity imparted from the dual series of paddles within the mixer and in consequence of the period of retention established by the length of the mixer, the material exiting therefrom at output port 136 is optimized for moisture content and, importantly for its bulk density or consistency. In order to enhance the aerobic digestion of the material, it is important that it retain a consistency or coarse texture evidencing a high void content facilitating the migration or movement of oxygen laden gas or air through its bulk content when deposited within the digester apparatus. The dual paddle system of mixer stage 18 may be described as asserting a "fluffing" action upon the materials passin therethrough, thereby promoting this necessary higher void content. This requirement also points to the importance of providing an expanded and size-limited biodegradable mixing material. Inasmuch as manure moisture content varies considerably from installation to installation, as well as in dependence upon the season in which it is collected, the amount of relatively dry straw which is admixed serves as a basic adjustment of moisture content for the material. Adjustment of the amount of this additive is provided by varying the rate of feed at conveyer 134 in the course of the operation of mixing stage 18. For smaller installations, portable moisture monitors, as described earlier in connection with block 32 in FIG. 1, may be utilized in carrying out the adjustment for optimized moisture content. A water input may be supplied to the mixer, for instance, through hopper 110 as described in connection with block 128 of the latter figure. This input provides for a vernier-type control over moisture content.

FIGS. 1 and 2 also show the presence of an input of slaughter house waste as would be available in a vertically integrated production facility. Particularly where the ultimately digested material is intended for conversion to a cattle feed, the high protein content from such wastes may be of considerable value. In FIG. 2, a typical tank-trailer from a tank-truck is revealed at 138. Such a truck generally will contain about a one week supply of such wastes and, upon operating of mixing stage 18, the wastes are delivered by a pump, as depicted at 140, through line 142, releasable coupling 144 and a flow valve 146 to hopper 104. A recirculation line 150 is provided in connection with pump 140 and tank 138 for purposes of maintaining the solid-liquid dispersion within the tank during its holding period of about one week at the waste treatment facility.

While straw has been described as a suitable material for use at mixing station 18, it should be understood that a variety of inert materials are available for utilization. For instance, shredded paper may be substituted for the straw. Where an assurance that contamination from insecticides and pesticides is not present, shredded municipal refuse may be utilized. Additionally, inert materials such as wood chips or ground bark may be substituted to achieve desired coarseness or void content of the mixed materials for digestion. Where such materials are used in a system intended for developing cattle feed and the like, they can be removed following the final development of compost and removal thereof from the digester apparatus. As is apparent, once so removed, as by screening procedures or the like, the materials may be recycled through station 18.

Lookin again to FIG. 1, a bulk density adjusted biodegradable material is shown at block 160 as being transferred to a digester station. Upon being transferred, as revealed at block 162, the material is uniformly deposited along the receiving region of a digester. Upon each deposition, as revealed at block 164, digestion is carried out in a multi-stage arrangement incorporating agitation of the material and consequent material migration through the receptacle retained bulk of the digester. As the particulate material migrates, it moves through regions wherein it exhibits a progressively diminishing biochemical oxygen demand (B.O.D.) until an optimally treated material is derived. In the course of the migration and agitation of the material, an oxygen laden gas is introduced to the digestion process, as indicated at block 166, and regions within the digestive process are monitored both for oxygen content of the gas being passed through the bulk as well as the temperature of the bulk, as revealed at block 168. The outputs of this oxygen-temperature monitoring function are directed along line 170 for utilization by a control function represented at block 172. This function then reasserts a control through line 174 to the oxygen supply at block 166. Following complete digestion, the material is removed from the lowest level of the digesting receptacle, as indicated at block 176, whereupon compost material is directed to a storage and post-treatment stage represented by block 178.

Figure 8:
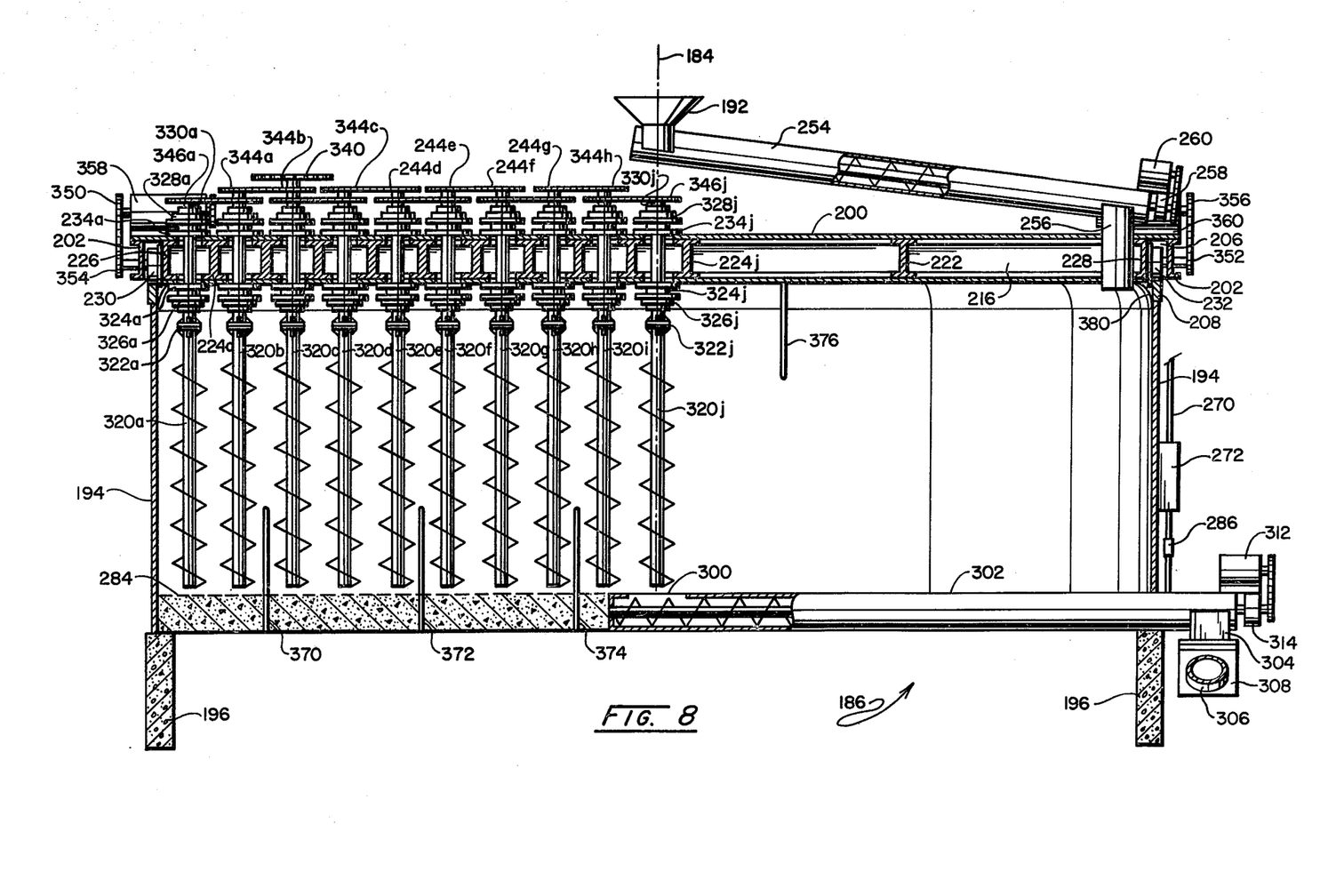
FIG. 8 is a partial sectional view of the digester apparatus shown in FIGS. 2, 3, 6 and 7.
Figure 9:
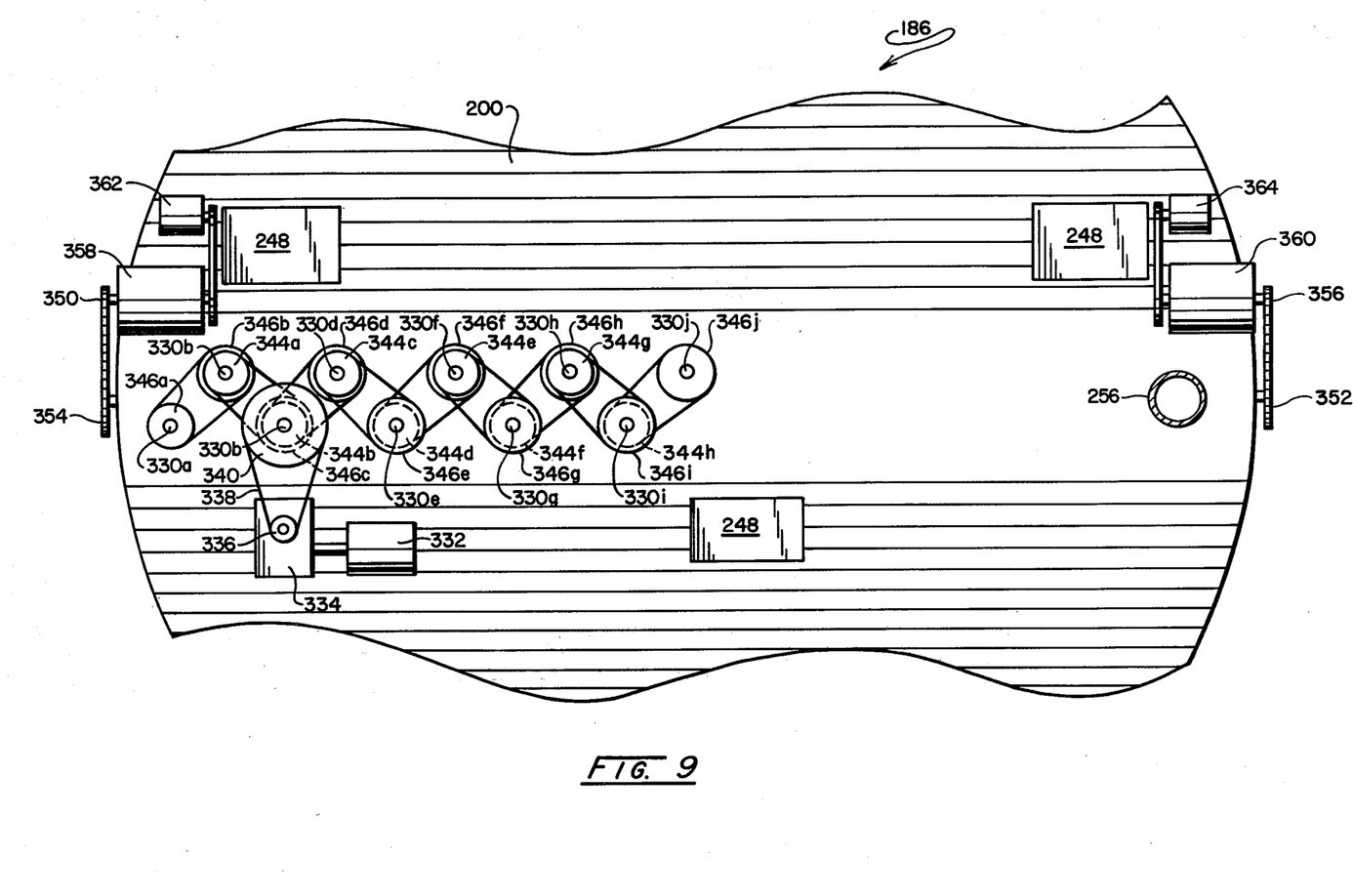
FIG. 9 is a top partial view of the apparatus of FIG. 8.

Returning to FIGS. 2 and 3, bulk density adjusted biodegradable material exiting from mixing stage 18 is deposited within a hopper 180 from which it is transferred for example via a screw-type conveyor 182 to a location elevated over the central axis 184 of a digester apparatus represented generally at 186. As shown in FIGS. 3 and 8, the material exits from conveyer 182 at an output port 188 connected, in turn, to a lead conduit 190. Conduit 190 is oriented for the deposition of material passing therethrough into a hopper 192 symmetrically positioned about axis 184. The figures reveal that digester apparatus 186 comprises a receptacle formed having an outer wall 194 of generally cylindrical surface configuration which is supported by a cylindrical foundation or footing 196 fashioned of concrete or the like. Wall 194 may be formed of a suitable sheet metal material, concrete block, or the like and is connected with foundation 196 in suitable fashion.

Figure 11:
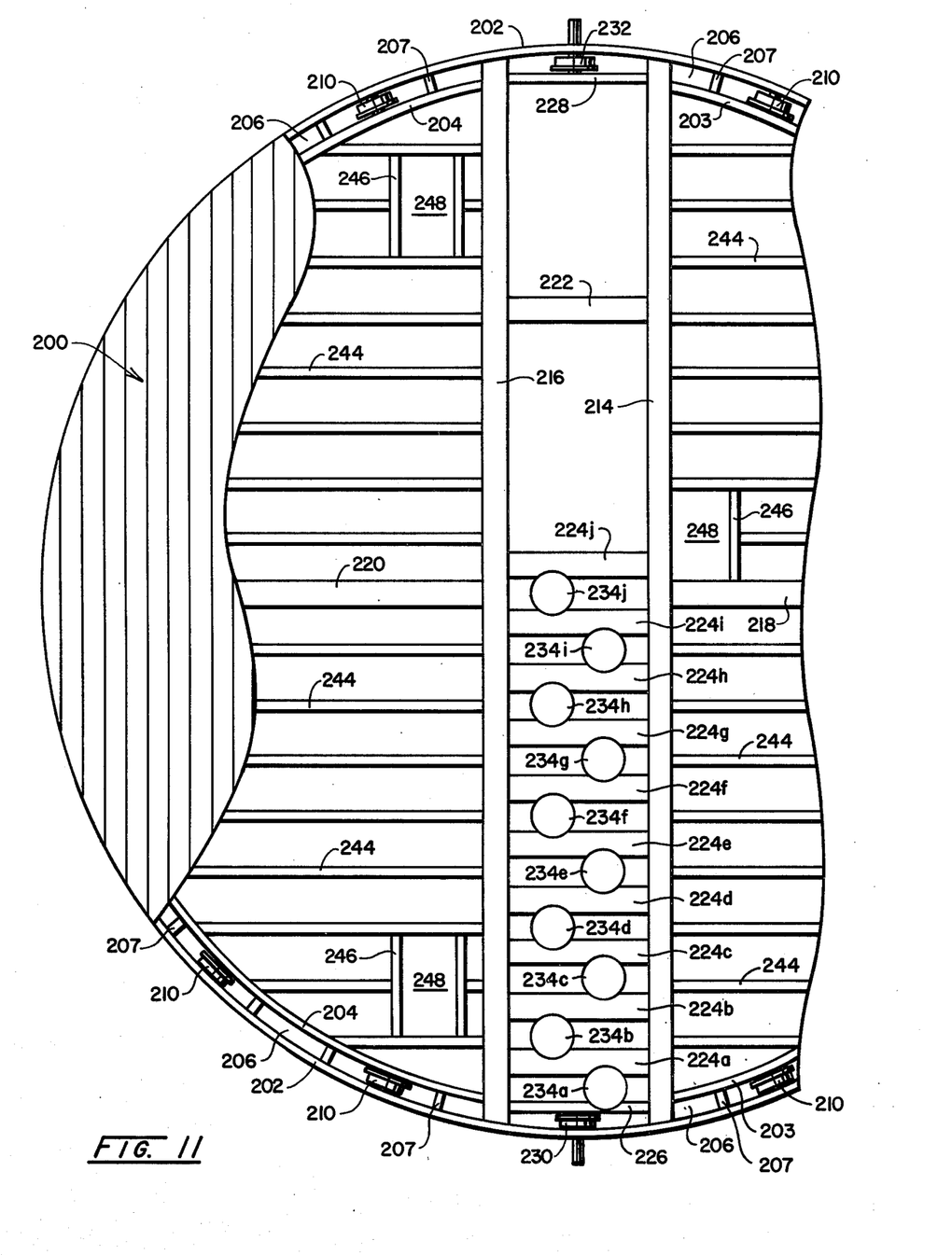
FIG. 11 is a top partial view of the apparatus of FIGS. 6–10 with portions removed to reveal internal structure.

The receptacle is enclosed by a rigid cover 200 of circular configuration. As is revealed in more detail in FIGS. 8 and 11, the outer circular periphery of cover 200 is fashioned having an outer circular form channel 202 which is coaxial and mutually radially spaced from oppositely disposed semicircular channels 203 and 204 to define a gap 206 therebetween (FIG. 11). Spacers 207 provide support across the gap 206. This gap 206 is located above the periphery of wall 194 which, additionally, is formed incorporating a metal rail 208. Axially supported within gap 206 intermediate channels 202 and 204 are a plurality of freely rotatable flanged wheels or bearings, certain of which are shown at 210 in FIG. 11. Extending across chords of the circle defined by channel 202 and rigidly connected thereto are two spaced wide flange beams 214 and 216. Additionally, similar beams 218 and 220 extend in radial fashion between channel 204 and respective beams 214 and 216. Beams 214 and 216 are interconnected by transversely oriented shorter length wide flange beams, located along one half or side of the assembly, while opposite thereto a transverse beam 222 is connected intermediate beams 214 and 216. On the noted one side of the assembly a plurality of such interconnecting beams are arranged in spaced fashion and are identified 224a–224j. Channel members 226 and 228 are positioned across the termini of beams 214 and 216 and serve to support the axles fixed to and extending through drive wheels for the roof structure revealed respectively at 230 and 232. As is described in more detail later therein, these symmetrically oppositely disposed drive members serve to rotate the rigid cover during operation of the apparatus. Their positioning assures unhindered rotational operation without the generation of spurious moments and the like. Not shown in FI. 11 are relatively thin steel plates, for instance of about one fourth inch thickness, which are weldably attached over the top and bottom of beams 214 and 216 as they extend from channel 226 to beam 224. These plates serve to support the spools from which the auger elements of the device depend. The lower flanges of the uppermost ones of the spools are revealed in FIG. 11 at 234a–234j. This same alphabetical suffix is utilized throughout the instant description to designate corresponding components of the serially disposed auger elements. Cover 200 serves, inter aalia, to protect the contents of the digester apparatus 186 from atmospheric elements. In this regard, it may be provided, for instance, with a tongue and groove type wooden top or roof portion. To support such a top, a plurality of beams are provided extending from inwardly disposed circular channel 203 to beam 216 as well as from inwardly disposed channel 204 to beam 216. These wooden beams are identified, for example, at 244. Where appropriate, the beams are utilized in conjunction with transverse members as at 246 to provide for access openings as indicated at 248. The wooden components utilized within the cover structure provide adequate support at lessened structural weight and, preferably, are pretreated with an appropriate preservative. Of course, other structural materials may be utilized to form the above-discussed structure.

As is revealed in FIGS. 2, 3 and 8, cover 200 serves, inter alia, as a support for a screw type conveyer 254 extending from hopper 192 to the vicinity of the cylindrical wall 194 of the digester apparatus. The distribution port of conveyor 254 is defined by a distribution conduit 256 extending from the terminus of conveyer 254 through rigid cover 200 just inside the cylindrical wall. Conveyer 254 is driven through a reduction gearing assembly 258 by belt drive association with a motor 260. With the arrangement, manure is internally deposited about the outward periphery of wall 194 in a fashon providing for the uniform distribution thereof about the internally disposed circumference of the apparatus.

Figure 6:
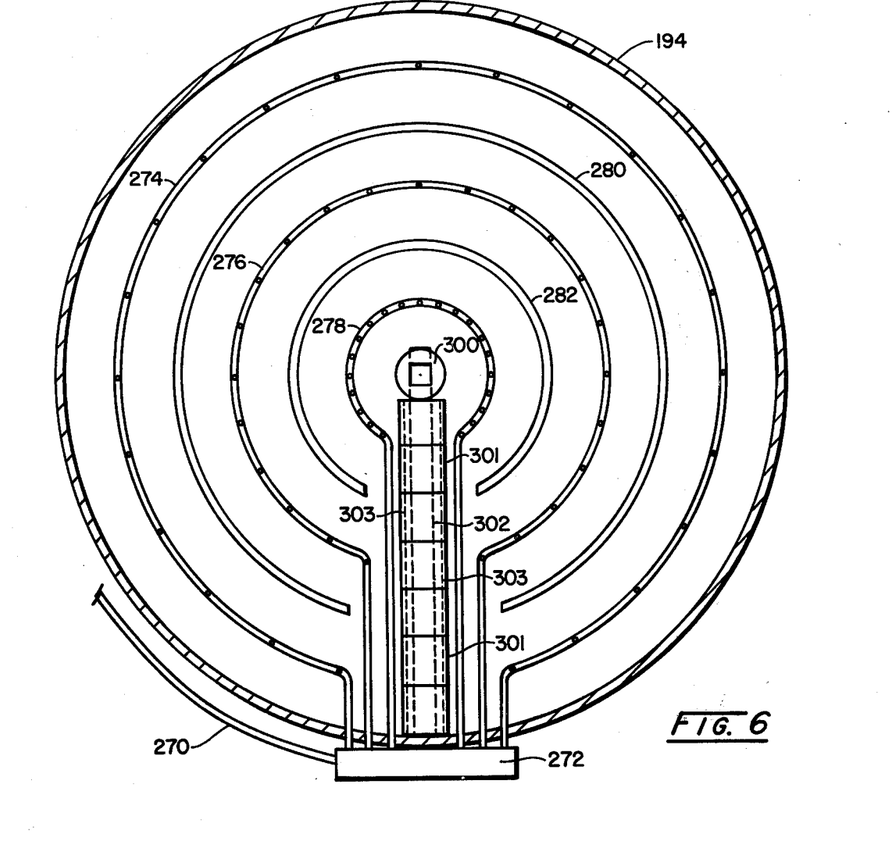
FIG. 6 is a top sectional view of portions of the digester apparatus shown in FIGS. 2 and 3.
Figure 7:
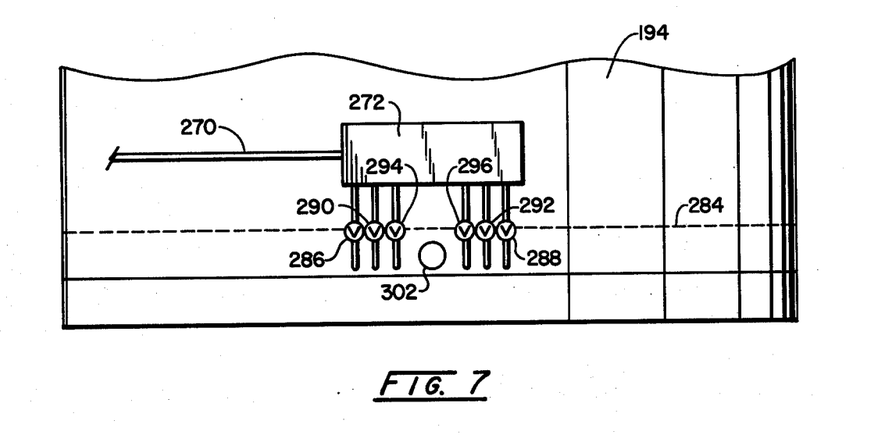
FIG. 7 is a partial side view of the digester apparatus of FIG. 6.
Figure 10:
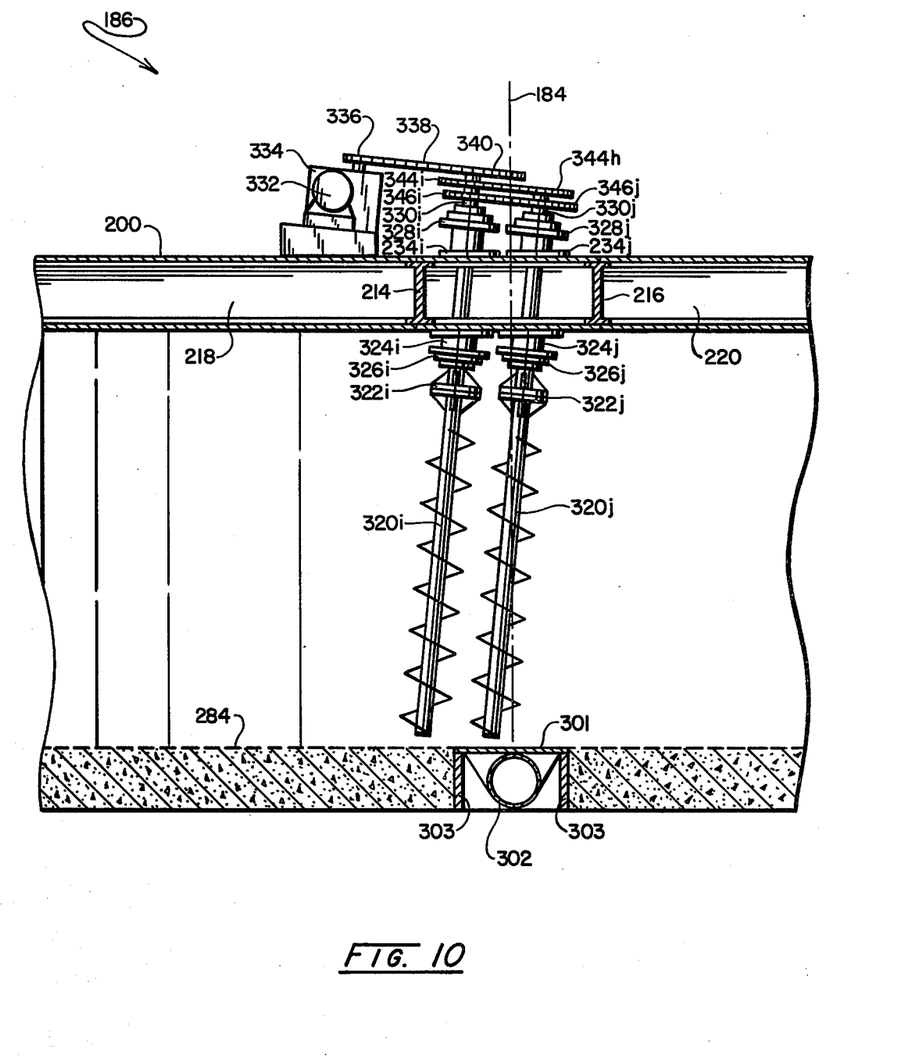
FIG. 10 is a partial sectional view of the apparatus of FIGS. 8 and 9.

Looking now to the bottom surface of apparatus 186, reference is made to FIGS. 3, 6, 7, 8 and 10. As noted earlier, the digestive process is carried out by subjecting a bulk density or void content adjusted biodegradable material of appropriate moisture content to oxygen laden gas treatment as well as agitation. The oxygen laden gas, here present as atmospheric air, is introduced into digester apparatus 186 from a motor driven blower 266 located, for this example, within a control room 268 of the building represented in FIG. 2. Air under pressure is directed from blower 266 along line 270 to a plenum 272 fixed to wall 194 of apparatus 186 (FIGS. 6 and 7). Plenum 272 serves as an air feed to a grouping of conduits located at the bottom portion of apparatus 186. These conduits are identified in FIG. 6 at 274, 276 and 278 and are arranged concentrically about the central axis of apparatus 186. The conduits are arranged to deliver air under pressure through small perforations formed therein within regions of the digestible material intended for influence. To delineate or label this influence, a concentrically disposed baffle 280 is positioned intermediate conduits 274 and 276, while a similar baffle 282 is positioned between conduits 276 and 278. The baffles have heights extending to the upper surface of diffuser material such as coarse aggregate deposited over the bottom surface of the assembly. The level of this diffuser material or aggregate is shown in FIGS. 8 and 10 at 284. As shown in FIGS. 6 and 7, connection between conduit 274 and plenum air supply 272 is provided through valves 286 and 288, while connection of conduit 276 with the air supply is through valves 290 and 292 and connection between conduit 278 and the air supply is through valves 294 and 296. These valves may be of a motor operated butterfly variety functioning in step fashion in response to commands received from a remotely disposed control station. Such control, for example, may be derived from a control facility as at 298 located within room 268 of the building shown in FIG. 2. The separate regions of influence defined through the utilization of discrete conduits as at 274–278 in combination with baffles 280 and 282 provide for a corresponding regionally oriented control over the digestive process. For example, discrete monitoring of temperature and oxygen content may be effected within the regions defined by baffles 280 and 282 and appropriate regulation asserted through valves 286–296 in correspondence with that monitoring. As noted at block 164 in FIG. 1, the biochemical oxygen demand (B.O.D.) of the material under treatment diminishes progressively as such material is migrated from one of the conduit and baffle-defined regions to the next.

As is revealed more clearly in FIGS. 6 and 8, also positioned within the lower portion of digester apparatus 186 is an output arrangement including a conduit 300 substantially centrally disposed within the apparatus and defining a rectangular opening or orifice at the upward surface 284 of the diffuser material or aggregate. This orifice-conduit, which may be either rectangular or circular in peripheral configuration, communicates with a screw conveyer 302 radially positioned within the diffuser material and extending through wall 194. Removable plates 301, supported by two channel members 303, cover conveyer 302. An output conduit 304 (FIGS. 3 and 8) extends downwardly from the conveyer 302 outwardly of the wall 194 of the digester and communicates (FIGS. 2 and 3) with a screw type discharge conveyer 306 through a hopper 308. Conveyer 306 extends upwardly to deposit compost into a storage region 310 in the building depicted in FIG. 2. Drive for screw conveyer 302 is provided by a variable speed motor 312 operating in belt drive relationship with a reduction gearing assembly 314 (FIG. 2).

As shown in FIGS. 8, 9, 10 and 11, agitation of the biodegradable material deposited within the digester apparatus 186 is provided by a series of rotatably driven augers alternately disposed along chords defined to be parallel to a given radius of the rigid roof structure 200. The discrete augers of the agitator arrangement are identified at $320a$–$320j$ and are shown extending from a tip portion situate just above level 284 of the aggregate diffuser material to upwardly disposed bolted flange couplings respectively revealed at $322a$–$322j$. Couplings $322a$–$322j$, in turn, are coupled with drive shafts extending through cover 200 at and rotatably supported by respective lower canted spool pieces $324a$–$324j$. Thrust bearings as at $326a$–$326j$ are positioned intermediate respective flanges $322a$–$322j$ and spool pieces $324a$–$324j$. The upward flanges of spool pieces $324a$–$324j$ are bolted to the earlier noted steel plate fixed in turn to the lower flanges of beams 214 and 216 described in connection with FIG. 11. Drive shafts extending respectively through spool pieces $324a$–$324j$ extend through corresponding spool pieces $334a$–$334j$ and respective thrust bearings $328a$–$328j$. These shafts are identified in FIG. 9 at $330a$–$330j$. Drive to shafts $330a$–$330j$ is provided from a motor 332 operating in conjunction with a reduction gear assembly 334. The output of reduction gear assembly 334 is connected through a sprocket 336 which asserts drive through chain 338 to a main drive sprocket 340. Sprocket 340, in turn, is fixed to shaft $330c$ which, in turn, imparts rotational drive to sprocket $344b$ of upper sprocket grouping $334a$–$344g$. Shaft $330c$ also imparts rotational drive to sprocket $346c$ of a lower grouping of sprockets similarly connected to respective shafts 330a-330j. Adjacent ones of the upper grouping of sprockets 344a-344f are appropriately connected as shown, by chain drives, as are adjacent groupings of the lower level sprockets 346a-346j. By adjusting the number of teeth in alternate ones of the sprockets, a drive is imparted to drive shafts 330a-330j wherein, for example, a 2 R.P.M. diminishment in rotational speed is progressively provided from auger to auger commencing with that auger driven from shaft 330b. For example, sprocket 344b may be provided with 35 teeth, while corresponding driven sprocket 344a is provided having 32 teeth. Sprocket 346b, coupled with the same shaft, may then be provided with 35 teeth, while sprocket 346a is provided with 32 teeth. In the same fashion, sprocket 346c may be provided having 32 teeth, while driven sprocket 346d may be provided having 35 teeth. This arrangement continues through to the centermost drive shaft 330j. As is revealed in FIG. 10, spool pieces 234a-234j and corresponding spool pieces 324a-324j are canted in the direction of intended rotation of cover 200 to facilitate the movement of the agitating system through the bulk mass of digestible material. As noted earlier in connection with FIG. 11 and shown in FIGS. 2, 8 and 9, this drive basically is provided from drive wheels 230 and 232 which are connected to corresponding drive sprockets, respectively shown at 350 and 352. Sprockets 350 and 352, in turn, are linked by chain drive to respective output sprockets 354 and 356 of associated reduction gearing assemblies 358 and 360. Assemblies 358 and 360 are driven from respective synchronous motor drives shown at 362 and 364. A belt connection is shown providing drive relationship between the latter components of the system.

For the application described as exemplary herein, the drive system for cover 200 provides for a rotation thereof of from about 2 to 4 revolutions per day. During these revolutions the agitation system including augers 320a-320j, confronts substantially all of the digestible material and imparts a vertical motion thereto. Additionally, a horizontal migration of the particles from the peripheral regions of the apparatus toward the center axis 184 thereof takes place. To assure proper digestion of all materials within the system, it is important that the migration along a horizontal vector be controlled. For instance, an unwanted condition would ensue where particles reach the surface of the digesting materials and "skip" across such top surface toward the center of the system. With the instant arrangement, however, such particles cannot be removed from the digester apparatus and any particles which are removed must be in a reliably fully digested state. In this regard, notice that the orifice opening 300 of the system is of substantially small peripheral extent with respect to the size of the periphery of walls 194. Further, this opening is substantially at the surface 284 of the diffusing aggregate material, i.e., at the very bottom of the digester. Consequently, only the lowermost level in centrally migrated materials can be removed through conveyor 302.

To promote the deposition of material into conveyor 302 which are situate in the vicinity of orifice 300, auger 320j is located substanially over orifice 300. As cover 200 is rotated, this auger is maneuvered, in turn, to define a somewhat conical pattern of movement about the orifice. This action promotes the corresponding deposition of fully digested material through orifice 300. The ratio of the circumference of orifice 300 with respect to that of wall 194 may be selected, for instance as about 1 to 20, however, the relative extent of the periphery of orifice 300 readily may be diminished with respect to the cirumference of the outer wall depending upon the particular desire of the designer. The assurance of a uniformly and properly treated material with the digestion apparatus permits the utilization of such material in the above-discussed recycling system for cattle feed, thus greatly enhancing the economic rational for incorporating digestion systems within the facilities of the cattle raising industry.

A particularly advantageous feature of the noted positioning of auger 320j over the discharge orifice 300 resides in the capability of promoting removal of fully digested materials without clogging of the system. For example, in prior art devices, clogging represents a serious operational problem usually necessitating the continuous operation of the device removing digested material from the apparatus. In the instant system, however, feeder 302 need be operated only when required i.e. on an intermittent basis. This assures removal of only properly digested materials. Additionally, the device may be operated automatically, for instance, through the utilization of probes as at 376 which are described later herein. Migration of materials further is facilitated by virtue of the fact that the digester incorporates no center support, migration materials being carried with complete freedom of movement.

Looking more specifically to the control over the digestion process, as the bulk density adjusted biodegradable material is deposited through conduit 256 into the receptacle of the digestion apparatus 186, it is distributed within a region disposed about the outer circumference thereof, uniformity of deposition being provided by the virtue of the rotation of cover 200. The augers of the agitating components of the system assert a vertically oriented movement to the particles of the material and a slight, horizontal vector defined migration of the bulk toward the center orifice over an extended period of time, for instance four to five days, is witnessed. The thus deposited and migrating material is subject to the influence of oxygen laden gas passing therethrough emanating from the diffusion aggregate and conduits 274, 276 and 278. Selective control over the amount of gas administered to the bulk within the regions defined by these conduits as well as by baffles 280 and 282 is desirable, inasmuch as the biochemical oxygen demand of the material diminishes as it undergoes aerobic thermophilic reaction or activity. Inasmuch as such activity is both temperature dependent and responsive as well as oxygen dependent, monitors perferably are provided within such defined regions and, particularly, in the vicinity of the exit orifice 300. To provide such monitoring, temperature and gas sampling probes are located within each of the regions. As revealed in FIG. 8, probes as at 370, 372 and 374 are arranged to protrude upwardly from the bottom portion of the digester, probe 370 being within the outermost peripheral region, probe 374 being within the region adjacent exit orifice 300 and probe 372 being in the region intermediate those designated above. Generally, such probes will sample both gas within the region as well as temperature about every minute and one-half. Additionally, a bulk level probe 376 is provided for purposes of monitoring the level of material within the digester. Oxygen analysis is carried out from the sampled gases drawn through probes 370–374, for instant application, a low value of oxygen generally being about 8% by weight, while an upper value for oxygen generally being about 16%. Of course, the levels determined for each region vary with desired B.O.D. conditions for the material being digested. Adjustment for oxygen level is readily accommodated by control over the valves 286–296 associated with each of the conduits 274–278. With respect to temperature levels, themophilic digestion generally is available between temperatures of about 130° F to 175° F. It is generally preferred to control the digestive process within this range at approximately 155° F. Preferably such level is maintained with about a 2° F tolerance. On the occasion of a temperature level reaching above the designated high level, higher quantities of air or oxygen laden gas are pumped into the digester to carry out a cooling function thus overriding the digestive process to a considerable extent. Additionally, high temperature can be lowered by progessively diminishing the input of oxygen laden gas or air through manipulation of the control valve at the input to the apparatus. When temperatures fall below the lower level, slightly more oxygen is introduced in appropriate regions to accelerate the aerobic thermophilic process.

Another feature of digester 186 resides in its capability for enhancing the pressure and consequently the oxygen content of the gas or air introduced into the receptacle portion thereof. In this regard, a flexible seal 380 (FIG. 8) may be attached to the outer periphery of cover 200. This seal slideably engages the upward portion of wall 194 and both assures the exclusion of atomspherically carried contaminants as well as provides a form of pressure retention within the receptacle. Note in this regard, that in normal operation, conduit 256 of fee conveyer 254 as well as the opening defined thereby into the digester receptable is filled with material awaiting deposition for digestion. As a consequence, the general pressure level of oxygen laden gas may be slightly elevated over atmospheric. This feature is helpful in improving digestion efficiency of the device at higher altitude locations. Loss of pressure through the conduit 256 can be minimized with complete reliability through the simple expedient of incorporating a "star" feeder therewithin. With such arrangement, no significant loss of pressure will be witnessed within the system.

Since certain changes may be made in the above-described system, apparatus and process without departing from the scope of the invention herein, it is intended that all matter contained in the description thereof or shown in the accompanying drawings shall be interpreted as illustrative and not in a limiting sense.

We claim:

1. Organic waste material digestion apparatus comprising:

a receptacle of generally cylindrical surface configuration having a circular top edge portion, a bottom portion supportable upon a base and exhibiting height and right cross-sectional diameter dimensions for retaining a predetermined volume of said waste material;

means for supplying oxygen-laden gas under pressure;

conduit means connected with said means for supplying gas, positioned within said receptacle at the level of the said bottom portion, including a plurality of spaced gas outlets arranged in a pattern for effecting an aerobic influence over substantially all said organic waste material deposited within said receptacle by gas issuing from said outlets;

diffuser means positioned within said receptacle, having an upward surface supporting said waste material above said conduit means for effecting a diffusion of said gas issuing from said outlets;

support means extending diametrically across said receptacle and supported upon said receptacle circular top portion and rotatable thereupon about the centrally diposed axis of said cylindrical surface;

input means supported upon and rotatable with said support means for delivering said waste material to said receptacle by deposition thereinto through said support means in the vicinity of said cylindrical surface;

agitator means including rotational, auger-type agitators supported by and extending from said support means substantially to the upwardly disposed surface of said diffuser means, said agitators being serially disposed and mutually spaced within two substantially parallel rows each extending from the vicinity of said centrally disposed axis toward said cylindrical surface and of number sufficient to confront substantially the entirety of said waste material upon a complete revolution of said support means about said axis; and output means including an orifice centrally located at said axis of said cylindrical surface at the said upward surface of said diffuser means, said orifice having a peripheral extent substantially small with respect to the peripheral extent of said cylindrical surface; and at least one said auger-type agitator being positioned above at least a portion of said output means orifice so as to effect an agitation of digested said waste material located thereabove.

2. The organic waste material digestion apparatus of claim 1 in which said agitator means includes agitator drive means for rotating said auger-type agitators at incrementally diminishing velocities with respect to the relative positions thereof progressing from said cylindrical surface toward said centrally disposed axis.

3. The organic waste material digestion apparatus of claim 1 including support means drive means drivably connected between said support means and said circular top portion for effecting the rotation of said support means about said centrally disposed axis at a predetermined rate.

4. The organic waste material digestion apparatus of claim 3 in which said support means drive means includes a first drive component mounted upon said cover at one given position adjacent said cylindrical surface, and a second drive component mounted upon said support means at a position adjacent said cylindrical surface substantially diametrically opposite said given position.

5. The organic waste material digestion apparatus of claim 1 wherein said support means is present as a rigid continuous cover and including a flexible seal positioned in a slideable adjacency intermediate said receptacle circular top edge portion and said rigid cover.

6. A system for treating organic waste material, including animal waste such as manure and the like, comprising:

receiving station means for receiving said waste material in an aerobically untreated state;

means for providing a size-limited and expanded cellulosic material;

mixing means for receiving, agitating and retaining for a predetermined interval both said waste material and said cellulosic material to provide a bulk density adjusted biodegradable material the bulk density and moisture content of said waste material being lowered at the termination of said predetermined interval to a value optimized for the thermophilic biodegradation thereof;

means for transferring said bulk density adjusted biodegradable material to a digester station means;

digester station means for inducing the aerobic decomposition of said density adjusted biodegradable material and including:

a receptacle of generally cylindrical surface configuration having a circular top edge portion, a bottom portion supportable upon a base ane exhibiting height and right cross sectional dimensions for retaining a predetermined volume of said bulk density adjusted biodegradable material;

means supplying oxygen-laden gas under pressure;

conduit means connected with said source of gas, positioned within said receptacle at the level of said bottom portion, including a plurality of spaced gas outlets arranged in a pattern for effecting an aerobic influence over substantially all of said density adjusted biodegradable material deposited within said receptacle by gas issuing from said outlets;

diffuser means positioned within said receptacle, having an upward surface supporting said waste material above said conduit means for effecting a diffusion of said gas issuing from said outlets;

support means extending diametrically across said receptacle and supported upon said receptacle circular top portion and rotatable thereupon about the centrally disposed axis of said cylindrical surface;

input means supported upon and rotatable with said support means for delivering said density adjusted biodegradable material from said transferring means thereinto through said support means in the vicinity of said cylindrical surface;

agitator means including rotational, auger-type agitators supported by and extending from said support means substantially to the upwardly disposed surface of said diffuser means, said agitators being serially disposed and mutually spaced within two substantially parallel rows each extending from the vicinity of said centrally disposed axis toward said cylindrical surface and of number sufficient to confront substantially the entirety of said bulk density adjusted biodegradable material upon a complete revolution of said support means about said axis, said agitator means and said diffused oxygen laden gas effecting a progressive diminution of the biochemical oxygen demand of said material;

output means including an orifice positioned at said axis of said cylindrical surface at the said upward surface of said diffuser means for removing said material evidencing a lowest biochemical oxygen demand value within said receptacle and designated compost material;

at least one said auger-type agitator being positioned above at least a portion of said output means orifice so as to effect an agitation of digested compost material located immediately above; and means for transferring said compost material to storage and post-treatment stages.

7. The system for treating organic waste material of claim 6 in which said cellulosic material is straw, and wherein said means for providing said size limited and expanded material includes a stage for shredding said straw prior to said mixing means reception thereof.

8. The system for treating organic waste material of claim 6 wherein said mixing means includes means for retaining and agitating said waste and cellulosic materials in the presence of a water adjuvant in an amount sufficient for deriving a moisture content for said bulk density adjusted biodegradable material within a range of about fifty to sixty percent by weight.

9. The system for treating organic waste material of claim 6 wherein said cellulosic material is an inert, coarse, void defining material and said post-treatment stages include means for removing said inert, coarse, void defining material from said compost material.

10. A method for aerobically treating animal waste material comprising the steps of:

receiving said material at a receiving station;

providing a biodegradable cellulosic material having a moisture content of value below that of said animal waste material;

shredding said cellulosic material to provide a size-limited and expanded biodegradable material;

mixing said size-limited and expanded biodegradable material with said animal waste material for an interval predetermined to provide a biodegradable material exhibiting a first value of biochemical oxygen demand and a bulk density and moisture content optimized for the efficient thermophilic aerobic reaction thereof induced by the passage of oxygen laden atmospheric air therethrough;

transferring said material of first value biochemical oxygen demand to a digester to provide a bulk quantity of said material supported upon a surface of said digester and extending about a given perimeter thereof;

passing oxygen laden atmospheric air from said surface through said bulk quantity of said material;

simultaneously agitating said bulk quantity of said material in a manner promoting the generally alternating vertical movement of said material from said supporting surface to the uppermost surface of said bulk material as well as the migration thereof toward a point of removal from said digester and to simultaneously promote a progressive diminution of said first value biochemical oxygen demand said agitation including the agitation of said bulk quantity of said material at a position substantially over said point of removal;

removing said migrated material of lowest value biochemical oxygen demand substantially only from the lowermost level of said bulk thereof at said point of removal substantially at the center of said digester; and transferring said removed material to a receiving station.

11. The method of claim 10 in which said waste material is cow manure and said biodegradable cellulosic material is straw.

12. The method of claim 10 in which the rate of said passage of oxygen laden atmospheric air is regulated in correspondence with said progressive diminution of said value of first value biochemical oxygen demand.

13. The method of claim 10 wherein said agitation of said bulk quantity of said material is carried out within said digester under oxygen laden atmospheric air pressure greater than the corresponding environmental atmospheric air pressure.

14. The method of claim 10 wherein said expanded cellulosic material is characterized in having a moisture content less than the moisture content of said animal waste material.

* * * * *